Aug. 1, 1967  F. J. VLASAK  3,334,039
ELECTRODE CONSTRUCTION IN OXYGEN SENSOR
Filed Jan. 6, 1964
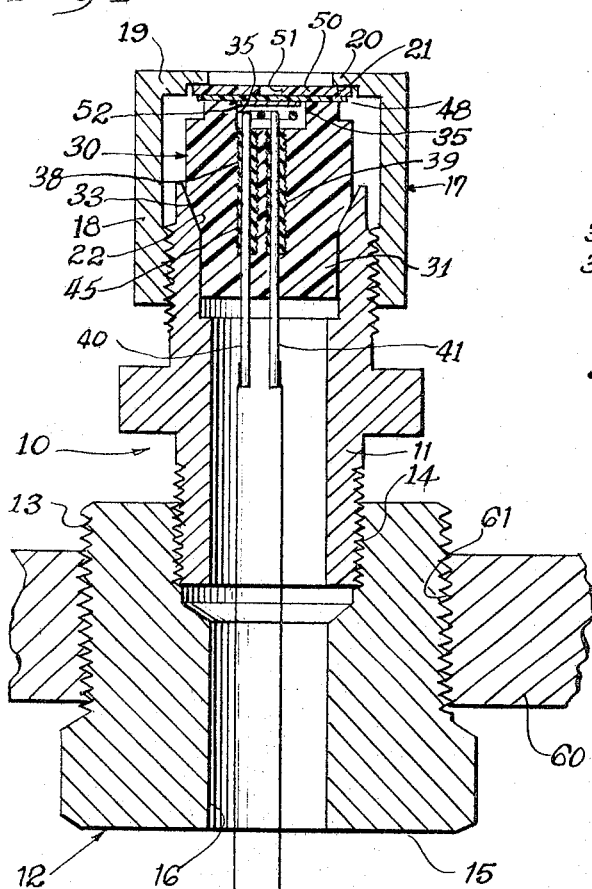
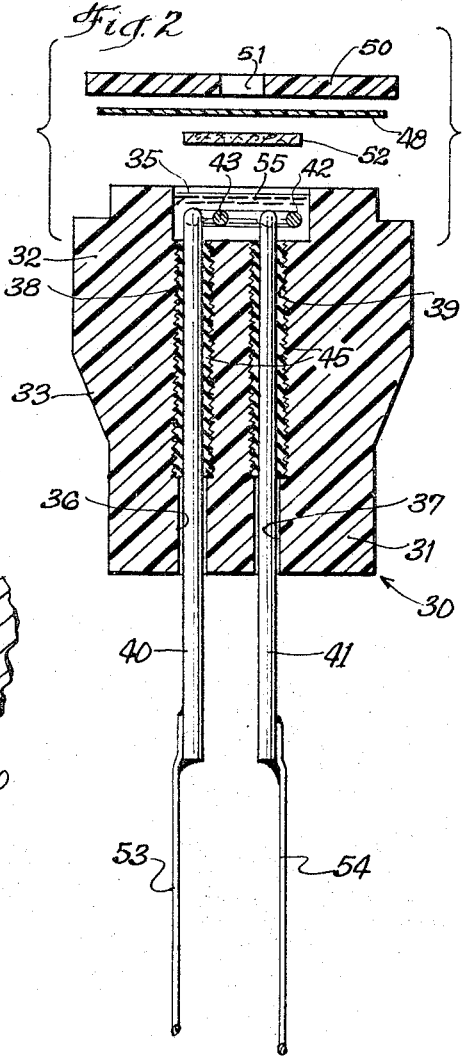
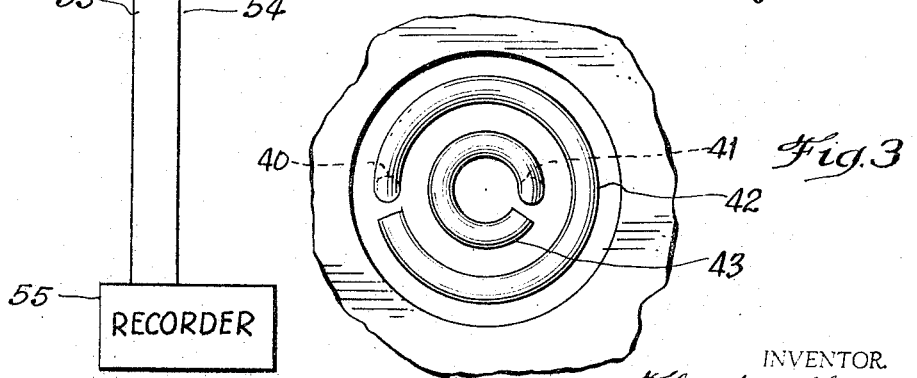
INVENTOR.
Floyd J. Vlasak
BY Robert S. Bramson
Attorney United States Patent Office 3,334,039
Patented Aug. 1, 1967

3,334,039
ELECTRODE CONSTRUCTION IN OXYGEN SENSOR
Floyd J. Vlasak, Wildwood, Ill., assignor to Abbott Laboratories, North Chicago, Ill., a corporation of Illinois
Filed Jan. 6, 1964, Ser. No. 335,725
6 Claims. (Cl. 204—195)

This application is directed to an electrode construction, and more specifically to a dissolved oxygen electrode capable of being sterilized at high temperatures and then being used for prolonged periods of time.

In the art of bacteriological fermentation, it is important to be able to accurately measure the amount of oxygen dissolved in a given fermentation medium. Such a medium may contain bacterial organisms, chemical salts, sugar, oil, and other organic and inorganic material. As in the human being, proper growth of bacteria is dependent upon the presence of an appropriate amount of oxygen. Too much oxygen or too little oxygen may have deleterious effects upon bacteria and their growth. Accordingly, it is highly desirable to be able to accurately measure the amount of oxygen which is dissolved in a fermentation medium in order that supply of oxygen to the medium may be correctively controlled so as to maintain a proper level of dissolved oxygen.

Fermentation media are often sterilized at temperatures of 125° C. and sometimes even higher. After sterilization, a cultured fermentation medium may be grown for as long as 14 days. It is therefore apparent that conventional electrode constructions will be inoperative or highly inaccurate for the measurement of dissolved oxygen in a fermentation medium because of the high temperatures of sterilization and long period of usage involved. Heretofore, electrodes have not been susceptible of use for accurately and consistently measuring the amount of dissolved oxygen in a fermentation medium after having been sterilized at high temperatures.

The instant device overcomes the deficiencies of the prior art devices and provides an electrode capable of accurately measuring the amount of dissolved oxygen in a medium after high temperature sterilization and for prolonged periods of time.

These desiderata are achieved by the instant electrode construction which provides a rugged, accurate and stable device. Applicant's electrode construction includes a resilient filler material isolating the cathode and anode from the electrode body so that differences in the coefficients of expansion of these elements are absorbed by the filler to prevent cracking of the electrode body as formation of unsealed apertures in the electrode assembly. The instant electrode is of such construction as to be effectively sealed at all interfaces so as to prevent efflux of electrolyte or influx of undesirable elements of the ambient.

Accordingly, it is an object of this invention to provide a dissolved oxygen electrode assembly capable of accurately and continuously measuring the amount of oxygen which is dissolved in a medium for prolonged periods of time, after high temperature sterilization of the electrode assembly.

It is a further object of this invention to provide an electrode construction in which expansion of the cathode, anode and electrode body will not cause cracking or the formation of unsealed apertures in the electrode assembly.

It is another object of this invention to provide an electrode construction which is highly adaptable for use in multifarious situations.

A concomitant object of this invention is to provide an electrode construction such that substantially all the oxygen entering the electrode is relatively instantly brought into contact with the cathode.

It is yet another object of this invention to provide an electrode of rugged construction.

Numerous other objects and attendant advantages of the invention will be apparent as it is better understood from the following detailed description, which, taken in connection with the accompanying drawings, discloses a preferred embodiment thereof.

Referring to the drawings:

FIGURE 1 is a cross-sectional view of an electrode, in situ, made according to the principles of this invention;

FIGURE 2 is an enlarged, partially exploded view of the electrode body of FIGURE 1;

FIGURE 3 is a partial top plan view of the electrode body of FIGURE 2.

Referring to the drawing, which illustrates a preferred embodiment of this invention, and particularly to FIGURE 1, an electrode assembly, generally designated as 10, includes a substantially cylindrical body housing 11, which is externally threaded at the opposing ends thereof. An end fitting 12 having an externally threaded periphery 13 and an internally threaded collar portion 14 is sealingly threadedly mounted to the proximal end of body member 11. The end face 15 of end fitting 12 has an aperture 16 therethrough. End fitting 17 has an internally threaded collar 18 which is sealingly threadedly mounted to the distal end of housing 11. End face 19 of member 17 has a circular aperture in the center thereof and a flange portion 20 surrounding the aperture and providing an internal shoulder 21.

Electrode body 30 is mounted in assembly 10 and comprises a cylindrical portion 31 of a diameter slightly less than the internad diameter of the distal end of housing 11, and at its other end, a cylindrical portion 32 having an external diameter substantially greater than the internal diameter of the distal end of housing 11. Cylindrical portions 31 and 32 are connected by tapered frusto-conical neck 32. The angle of taper of frusto-conical portion 33 is complementary to the angle of taper of the internally tapered distal end portion 22 of housing 11. A cylindrical bore or reservoir 35 in the distal end face of member 30 is of somewhat lesser diameter than the aperture in member 17 and is in substantial axial alignment therewith.

A pair of parallel bores 36 and 37 are formed in electrode body 30 and extend from the proximal end of the body to the distal end thereof and open into the bore 35. The upper portions 38 and 39 of bores 36 and 37 are enlarged and internally threaded.

Anode 40 extends through bore 36 and terminates at its distal end in an almost circular loop portion 42 which is located in reservoir 35. Cathode 41 extends through bore 37 and terminates at its distal end in an almost circular portion 43, which is of lesser diameter than circular portion 42 of anode 40. Curved portions 42 and 43 are substantially coplanar and concentric.

Bore portions 38 and 39 are substantially greater in diameter than the respective anode 40 and cathode 41 and the space between the respective threaded bore portions 38 and 39 and anode 40 and cathode 41 is filled with a resilient filler material 45, such as silicone rubber. The filler provides a fluid-tight seal between the bore portions 38 and 39 and the respective anode and cathode.

A thin, oxygen permeable membrane 48, composed of Teflon, overlies bore 35 and extends to a point below shoulder 21. A Teflon spacer 50 overlies membrane 48 and abuts shoulder 21. Spacer 50 has a centrally located aperture 51 in approximate vertical alignment with the loop portion 43 of the cathode. The diameter of aperture 51 is approximately equal to the diameter of the loop portion 43. Spacer member 52 rests upon the anode loop portion and separates the loop portions of the anodes and cathodes from Teflon membrane 48. Spacer membrane 52 is very thin, and may be formed of filter paper, glass cloth, and the like; it serves to prevent any sharp edges of the anode and cathode loops from piercing the thin membrane 48. Spacer 52 also serves to maintain a fixed relationship between anode 43 and membrane 48 as well as providing a firm base for membrane 48. An electrolyte 55 completely fills the reservoir formed by bore 35.

End member 17 is screwed down on body member 11 such that electrode body 30 is securely held between end portion 19 and tapered end 22. The oppositely tapered portions 33 and 22 of the electrode body and the housing body provide a fluid-tight seal therebetween.

Electrical conducting wires 53 and 54 are respectively connected to the proximal ends of anode 40 and cathode 41 and pass through aperture 16 in fitting 12 and are connected to an appropriate recording device 55.

The electrode assembly is threadedly secured to an internally threaded aperture 61 in the wall 60 of a fermentation tank. The electrode assembly is located below the liquid level in the fermentation tank.

Electrode body 30 is formed of Teflon, the important qualities of which are its heat resistance and its electrical insulting capacity. Other heat resistant, electrically insulating materials such as Bakelite, hard rubber, epoxy resins, high temperature plastics and the like may be utilized in lieu of Teflon. Spacer 50 is also formed of Teflon, but the aforementioned materials having high heat resistance and electrical insulating characteristics may be utilized in lieu thereof.

Membrane 48 is also composed of Teflon but other oxygen permeable, heat resistant, electrically insulating materials such as polypropylene, silicone rubber and the like, may be substituted therefor.

Housing members 11, 12 and 17 may be formed of plastic or metal or any other suitable sturdy, heat resistant material.

Anode 40 may be composed of silver and cathode 41 may be composed of platinum or gold.

The electrolyte utilized may be potassium hydroxide, potassium chloride, sodium hydroxide, barium hydroxide and the like.

The instant electrode construction provides a fluid-tight heat resistant device which is capable of being sterilized at temperatures of 125° C. and higher, and then being utilized for the measurement of dissolved oxygen continuously and for extended periods of the time. The wedge seal between tapered member 33 and 22 of electrode body 30 and housing body member 11, respectively provide an effective liquid seal at this interface. This seal provides a secondary barrier to any fluid which might get through the threaded connection between end member 17 and body member 11. The end face 19, spacer member 50, and oxygen permeable membrane 48, prevent liquid from leaking around the edges of the spacer, by virtue of the fact that the spacer and oxygen permeable membrane are tightly sealed between the distal ends of electrode body 30 and shoulder 21 of end member 17. The spacer member 52 is also oxygen permeable so that oxygen which permeates Teflon membrane 48 will pass through spacer member 52 so that it may be taken up by the cathode.

The looped, almost circular shapes of the distal portions of the anode and cathode provide an increased surface area for contact with the electrolyte and permeated oxygen so that a more accurate and prolonged continuous measurement of the dissolved oxygen may be obtained. Also, the alignment of the cathode end portion 43 and aperture 51 and their mutual proximity cause permeated oxygen to travel directly to the cathode without accumulating in corners of bore 35, thereby providing a continuous, representative flow of dissolved oxygen.

Since electrode body 30, anode 40, and cathode 41 are constructed of different material, at high temperatures the different coefficients of expansion of these materials could cause a cracking or the formation of unsealed apertures in the electrode body. Such damage could result in leakage of electrolyte from chamber 35 and failure of the normal operations of the electrode. Because the respective anode and cathode are separated from the electrode body by the silicone rubber filler material 45, the resilient filler material will absorb any differences in the coefficients of expansion of the cathode, anode and electrode body by virtue of its resilience. The fact that bores 38 and 39 are internally threaded provides additional rough surface for the silicone rubber filler to adhere to, to insure that the filler provides a tight permanent seal at its edges.

In forming the electrode, the filler material, in a liquid state, is poured in bores 38 and 39 of the electrode body. Anode and cathode bodies 40 and 41 are then inserted through the filler material. The filler material is important because it provides a seal to prevent leaking of electrolyte. The proximal ends of bores 36 and 37 need not be filled with silicone rubber, because sealing at these ends is not critical. These proximal end bores are of substantially larger diameter than the anode and cathode wires so that any differences in coefficients of expansion between the anode, cathode and electrode body 31 will not have any deleterious effects, because of the space between these elements. The threading of bores 38 and 39 could be eliminated; however, the threading effects a superior seal. Other means for increasing and roughening the surfaces of bores 38 and 39, such as abrasion of the bores or the like, may alternatively be utilized to improve the seal between rubber filler and the bores.

It is to be noted that a proper relationship between the cathode loop 43 and the portion of permeable membrane 48 through which oxygen permeates is highly desirable. This is true because oxygen permeating the membrane should be reduced directly at the cathode in order to prevent obtaining erroneous reading, so that accumulation of oxygen in other portions of bore 35 should be avoided.

Although the electrode of this invention has been described for use in fermentation media, it is obvious that the sturdiness and accuracy of this electrode construction render it desirable for use in other circumstances in which it is necessary to accurately measure dissolved oxygen or the like. This electrode construction is also capable of use to measure dissolved oxygen in liquids such as bodies of water, boiler feed water, waste treatment plants, and the like.

Although the preferred embodiment shows a separate spacer between the end member 17 and the oxygen permeable member 48, it is clear that the end member 17 may be so constructed as to have a small central aperture therein, so as to avoid the necessity of a spacer member. However, the spacer member provides a superior seal between the permeable member 48 and end member 17.

It is clear that many departures from the preferred embodiment disclosed herein may be effected without departing from the spirit and scope of this invention. For instance, the electrode housing member 10 need not be threadedly mounted in the tank but could be provided with a sealing end cap and freely suspended therein. Furthermore, the end members of the housing may be attached to the housing member by other sealing devices than the threaded portions shown. For instance, friction washers may be used to effect a seal between the end members and the housing body member.

It is thought that the invention and many of its attendant advantages will be understood from the foregoing detailed description, and it will be apparent that various changes may be made in the form, construction and arrangement of the parts without departing from the spirit and scope of the invention, or sacrificing all of its material advantages, the form hereinbefore described being merely a preferred embodiment thereof.

What is claimed is:

1. An electrode assembly comprising an electrode body, an electrolyte chamber defined by said electrode body at an end thereof, an oxygen permeable membrane sealingly overlying said electrolyte chamber, bore means defined by said electrode body interconnecting said electrolyte chamber and the other end of said electrode body, a cathode wire and an anode wire of substantially lesser diameter than said bore means extending therethrough into said electrolyte chamber and terminating in a pair of concentric substantially circular loop portions substantially coaxial with said electrolyte chamber, the diameter of the cathode loop being less than the diameter of the anode loop, a supporting member overlying said membrane having an aperture in vertical alignment with the loop portion of said cathode wire, and resilient filler means sealingly mounting each of said cathode and anode wires in said bore means.

2. An electrode assembly comprising an electrode body, an electrolyte chamber defined by the distal end of said electrode body, an oxygen permeable membrane overlying and sealing said electrolyte chamber, a supporting member having an aperture therein overlying said membrane, bore means defined by said electrode body interconnecting said electrolyte chamber and the proximal end of said electrode body, a cathode wire and an anode wire of substantially lesser diameter than said bore means extending therethrough into said electrolyte chamber and terminating at the distal ends thereof in concentric loop portions substantially coaxial with said electrolyte chamber, and resilient means sealingly mounting each of said cathode and anode wires in said bore means.

3. Apparatus as set forth in claim 2 wherein said bore means are threaded at the distal end portion thereof.

4. An electrode assembly comprising an electrode body having a large diameter cylindrical portion and a smaller diameter cylindrical portion connected by a tapered neck portion, an electrolyte chamber defined by the distal end of said large diameter portion, a hollow housing having a tapered distal end face, the angle of taper of said end face being substantially complementary to the angle of taper of said neck portion, means compressingly urging the tapered neck of said electrode body against the complementary neck of said housing to form a fluid-tight seal therebetween, bore means defined by said electrode body and intercommunicating said electrolyte chamber and the proximal end of said electrode body, said bore means having an internally threaded distal portion, an anode wire extending through said bore means and terminating at its distal end in said electrolyte chamber in a substantially circular loop portion coaxial with said chamber, a cathode wire extending through said bore means and terminating at its distal end in a substantially circular loop portion of lesser diameter than said anode loop and coaxial therewith, each of said anode and cathode wires being of substantially lesser diameter than said bore means, a silicone rubber filler filling said bore means between the threaded portion and said wires, an oxygen permeable membrane mounted over said electrolyte chamber and sealing the periphery thereof, and an electrolyte completely filling said electrolyte chamber.

5. An electrode assembly comprising an electrode body having a large diameter cylindrical portion and a smaller diameter cylindrical portion connected by a tapered neck portion, an electrolyte chamber defined by the distal end of said large diameter portion, a hollow housing having a tapered distal end face, the angle of taper of said end face being substantially complementary to the angle of taper of said neck portion, means compressingly urging the tapered neck of said electrode body against the complementary neck of said housing to form a fluid-tight seal therebetween, a pair of longitudinal bores defined by said electrode body and intercommunicating said electrolyte chamber and the proximal end of said electrode body, each of said bores having an internally threaded distal portion, an anode wire extending through one of said bores and terminating at its distal end in said electrolyte chamber in a substantially circular loop portion coaxial with said chamber, a cathode wire extending through the other of said bores and terminating at its distal end in a substantially circular loop portion of lesser diameter than said anode loop and concentric therewith, each of said anode and cathode wires being of substantially lesser diameter than each corresponding bore, a resilient filler material filling bore between the threaded portion and the corresponding wire, and an oxygen permeable membrane overlying said electrolyte chamber and sealed at the periphery thereof.

6. An electrode assembly comprising an electrode body having a large diameter cylindrical portion and a smaller diameter cylindrical portion connected by a tapered neck portion, an electrolyte chamber defined by the distal end of said large diameter portion, a hollow housing having a tapered distal end face, the angle of taper of said end face being substantially complementary to the angle of taper of said neck portion, end cap means secured to the distal end of said housing encompassing the large diameter portion of said electrode body and compressingly urging the tapered neck of said electrode body against the complementary neck of said housing to form a fluid-tight seal therebetween, an aperture defined by the distal end of said end cap means in substantial axial alignment with said electrolyte chamber, a pair of longitudinal bores defined by said electrode body and intercommunicating said electrolyte chamber and the proximal end of said electrode body, each of said bores having an internally threaded distal portion, an anode wire extending through one of said bores and terminating at its distal end in said electrolyte chamber in a substantially circular loop portion coaxial with said chamber, a cathode wire extending through the other of said bores and terminating at its distal end in a substantially circular loop portion of lesser diameter than said anode loop and coaxial therewith, each of said anode and cathode wires being of substantially lesser diameter than each corresponding bore, a silicone rubber filler filling each bore between the threaded portion and the corresponding wire, an oxygen permeable membrane mounted over said electrolyte chamber and sealing the periphery thereof, a spacer separating said cathode loop and said membrane, and an electrolyte completely filling said electrolyte chamber.

References Cited
UNITED STATES PATENTS

| | | | |
|---|---|---|---|
| 2,281,594 | 4/1942 | Pearl | 165—82 |
| 2,480,557 | 8/1949 | Cummins | 136—221 |
| 2,799,793 | 7/1957 | De Cain | 165—80 |
| 2,816,739 | 12/1957 | Stoehr | 165—83 |
| 2,906,801 | 9/1959 | Fritts | 136—230 |
| 2,928,782 | 3/1960 | Leisey | 204—195 |
| 2,960,455 | 11/1960 | Frankenthal | 204—195 |
| 2,964,941 | 12/1960 | Marsh et al. | 324—30 |
| 3,224,436 | 12/1965 | Le Massena | 204—195 |
| 3,227,643 | 1/1966 | Okun et al. | 204—195 |

JOHN H. MACK, *Primary Examiner.*

T. TUNG, *Assistant Examiner.*